US008515840B2

(12) United States Patent
McCabe

(10) Patent No.: US 8,515,840 B2
(45) Date of Patent: Aug. 20, 2013

(54) MODULAR ELECTRONIC WALLET

(75) Inventor: Colin T. McCabe, Brooklyn, NY (US)

(73) Assignee: American Express Travel Related Services Company, Inc., New York, NY (US)

(*) Notice: Subject to any disclaimer, the term of this patent is extended or adjusted under 35 U.S.C. 154(b) by 630 days.

(21) Appl. No.: 11/866,009

(22) Filed: Oct. 2, 2007

(65) Prior Publication Data

US 2009/0089176 A1 Apr. 2, 2009

(51) Int. Cl.
*G06Q 40/00* (2012.01)
(52) U.S. Cl.
CPC ..................................... *G06Q 40/00* (2013.01)
USPC .............................................................. 705/35
(58) Field of Classification Search
None
See application file for complete search history.

(56) References Cited

U.S. PATENT DOCUMENTS

| | | | |
|---|---|---|---|
| 5,815,657 A | 9/1998 | Williams et al. | 395/186 |
| 5,838,315 A | 11/1998 | Craycroft et al. | 345/333 |
| 6,058,378 A * | 5/2000 | Clark et al. | 705/37 |
| 6,237,004 B1 | 5/2001 | Dodson et al. | 707/102 |
| 6,446,048 B1 | 9/2002 | Wells et al. | 705/35 |
| 6,606,606 B2 | 8/2003 | Starr | 705/35 |
| 6,704,714 B1 * | 3/2004 | O'Leary et al. | 705/39 |
| 6,859,212 B2 | 2/2005 | Kumar et al. | 345/744 |
| 6,873,974 B1 | 3/2005 | Schutzer | 705/41 |
| 7,036,087 B1 * | 4/2006 | Odom | 715/779 |
| 7,134,087 B2 | 11/2006 | Bushold et al. | 715/764 |
| 7,149,741 B2 | 12/2006 | Burkey et al. | 707/100 |
| 7,155,411 B1 | 12/2006 | Blinn et al. | 705/40 |
| 7,181,438 B1 * | 2/2007 | Szabo | 707/2 |
| 7,363,592 B1 * | 4/2008 | Odom | 715/779 |
| 7,469,233 B2 * | 12/2008 | Shooks et al. | 705/67 |
| 7,493,288 B2 * | 2/2009 | Biship et al. | 705/50 |
| 7,505,941 B2 * | 3/2009 | Bishop et al. | 705/67 |
| 7,748,620 B2 * | 7/2010 | Gomez et al. | 235/383 |
| 7,792,748 B1 * | 9/2010 | Ebersole et al. | 705/39 |

(Continued)

FOREIGN PATENT DOCUMENTS

WO 0199019 12/2001

OTHER PUBLICATIONS

"The New Google Toolbar," http://www.axi.ca/tca/Nov2003/technologytips_1.shtml, The Canadian Association, Nov. 2003.

(Continued)

*Primary Examiner* — Bruce I Ebersman
(74) *Attorney, Agent, or Firm* — Snell & Wilmer L.L.P.

(57) ABSTRACT

A computer program is provided that causes a computer to enable a user to make an electronic payment via a communication network. A user is authenticated to a server computer. The computer retrieves identification information stored in a memory region of the computer, and transmits the identification information to a server computer via the communication network. In addition, the computer displays a personal-finance toolbar on a portion of the display screen, and the computer receives from the server computer, via the communication network, financial information of at least one financial account corresponding to the user. The computer displays, on the tool bar, at least some of the financial information received from the server computer. The computer concurrently displays on the display screen the tool bar and a Web page of a Web site, which is a purchase page on which the user may input purchase information. The computer automatically inputs the purchase information to the purchase page in response to activation of an icon on the toolbar, wherein the computer obtains the purchase information from at least one memory region of the computer.

14 Claims, 11 Drawing Sheets

(56) References Cited

U.S. PATENT DOCUMENTS

| | | | |
|---|---|---|---|
| 7,953,671 B2* | 5/2011 | Bishop et al. | 705/67 |
| 2001/0034717 A1* | 10/2001 | Whitworth | 705/64 |
| 2001/0051996 A1* | 12/2001 | Cooper et al. | 709/217 |
| 2002/0026423 A1 | 2/2002 | Maritzen et al. | 705/56 |
| 2002/0077978 A1* | 6/2002 | O'Leary et al. | 705/40 |
| 2003/0023754 A1* | 1/2003 | Eichstadt et al. | 709/246 |
| 2003/0088483 A1 | 5/2003 | Moyer | 705/27 |
| 2003/0229893 A1* | 12/2003 | Sgaraglino | 725/37 |
| 2005/0187883 A1* | 8/2005 | Bishop et al. | 705/67 |
| 2005/0246292 A1 | 11/2005 | Sarcanin | 705/67 |
| 2006/0106680 A1 | 5/2006 | Shafron et al. | 705/26 |
| 2006/0156385 A1* | 7/2006 | Chiviendacz et al. | 726/2 |
| 2007/0005967 A1* | 1/2007 | Mister et al. | 713/168 |
| 2007/0276765 A1* | 11/2007 | Hazel et al. | 705/71 |
| 2007/0294169 A1* | 12/2007 | Beck et al. | 705/44 |
| 2008/0222047 A1* | 9/2008 | Boalt | 705/67 |
| 2009/0024533 A1* | 1/2009 | Fernandes et al. | 705/75 |
| 2009/0048953 A1* | 2/2009 | Hazel et al. | 705/35 |

OTHER PUBLICATIONS

"About Autofill," http://toolbar.google.com/autofill_help.html, Google, (believed to be at least as old as Nov. 2003.).

"ECML v1.1: Field Specifications for E-Commerce," http://www.ietf.org/rfc/rfc3106.txt, The Internet Engineering Task Force, Apr. 2001.

"Discover Card Introduces Discover DeskshopSM 2.0: The first real solution for safer, easier online shopping," http://pressroom.discovercard.com/data/articles/2000/11/28/200308151420451.prt.shtml#top, Discover Financial Services, Nov. 28, 2000.

"Secure Online Account Numbers," http://www2.discovercard.com/deskshop/deskshop.shtml, Discover Financial Services, (believed to be at least as old as Nov. 28, 2000).

"Electronic Wallets Make Shopping Online Faster and Easier," http://web.archive.org/web/20040325202354/www.citibank.com/us/cards/cardserv/shopping/wallet.htm, 2004.

"Virtual Account Numbers," http://web.archive.org/web/20040202024007/www.citibank.com/us/cards/cardserv/shopping/van.htm, 2003.

"Citibank Enhances Online Credit Card Fraud Protection for Consumers, Introduces Virtual Account Numbers," Market Wire, Jun. 2002, http://findarticles.com/p/articles/mi_pwwi/is_200206/ai_mark02043877/print.

"Citibank VAN FAQ," https://www.accountonline.com/View?docId=VanFAQOutsidePop&siteId=CB#5, Citicards, (believed to be at least as old as Jun. 2002).

"Citi Offers Virtual Account Numbers To Wary Online Shoppers," http://www.creditcards.com/Citi-Offers-Virtual-Account-Numbers.php, CreditCards.com, Feb. 10, 2006.

Office Action dated Oct. 23, 2012 in Canadian Application No. 2,701,952.

EP; Examination Report dated Oct. 13, 2011 in Application No. 08834858.6.

PCT; International Preliminary Report on Patentability dated Apr. 15, 2010 in Application No. PCT/US2008/078420.

PCT; International Search Report dated Dec. 2, 2008 in Application No. PCT/US2008/078420.

PCT; Written Opinion dated Dec. 2, 2008 in Application No. PCT/US2008/078420.

* cited by examiner

Bill Payments

| Payee | Amount | Due Date |
|---|---|---|
| Verizon | 283.28 | Feb 28/07 |
| Con Ed | 28.28 | Mar 23/07 |
| Keyspan | 584.28 | Jan 12/07 |

One Card Savings T...

Keyspan 584.28  Jan 12/07

Keyspan 584.28  Jan 12/07

Verizon

Outstanding Balance: $397.28
Recent Payments: $0.00

Amount Due: $283.28
Due Date: Feb 28, 2007

Fri, Jan 19, 2007, 10:41:22 EST company logo if available

Pay Bills

☑ Verizon - $283.28
☑ Con Ed - $28.28
☐ Keyspan - $584.28

Total Selected
$211.56

From
CitiBank 104 293 238 ▼

Pay Selected Bills

An email transaction record will be sent to your email address. Want to remove or add a payee?

Open Link

Pay this Bill
Pay all Bills
Edit Payee List

Copy
Copy Link

Send to Friend ...

Customize Klip to website 602
604
606
608

FIG. 6

MODULAR ELECTRONIC WALLET

BACKGROUND OF THE INVENTION

Field of the Invention

Inputting personal information into Internet web page forms is often a repetitive and time-consuming process. For example, in the online shopping context, a consumer wishing to complete a checkout process at a merchant's website will likely have to input most or all of the following information: first name, last name, middle initial, street address, billing address, telephone number, e-mail address, and financial transaction account information. This information may not be the same each time a shopper makes an online purchase. For example, a shopper may use different credit cards for various purchases. Thus, each time the consumer wishes to make a purchase from another online merchant, a consumer must input the same or similar information to complete the online checkout process.

This manual entry of information into online forms is tedious and fraught with the likelihood of omissions and input errors. For example, a shopper typing payment information into a checkout webpage may forget to complete some of the fields in the online form. This error may result in losing all of the typed information if a user the presses the "back" button in a web browser, frustrating a user and increasing the time to complete the data input. In online shopping, such errors may go undetected by the shopper until after the checkout process is completed and the shopper may only be notified at a later time by the merchant that the information is incomplete or erroneous. In such a case, these problems could lead to an online shopping order being delayed or possibly canceled.

In addition, a person inputting information into Internet web pages may have different sets of information that they wish to input for different web pages. For example, in online shopping, a shopper may have multiple credit cards that they use for different purposes, for example, to get an extended product warranty, to maximize loyalty points, or to earn cash back bonuses for specific types of purchases. In such a case, a shopper must input the information into the web page that is relevant for the specific credit card for that purchase type. This manual process again is time consuming and fraught with error.

A further problem with existing web page input methods is that the user inputting the information must either input from memory, transcribe from another source (such as from a credit card), or "cut and paste" the information into the online fields from an electronic document, such as, for example, a text editor or word processor. In the case of online shopping this typically means that a shopper has to search for a credit card from a wallet or a purse and transcribe the information into the web page, field by field. A shopper who uses a specific credit card for only limited purposes may forget to use the card, may inadvertently not use the card at all.

In addition, in the context of online shopping, a shopper frequently must have physical possession of the credit card in order to read the information to input. Alternatively, a shopper could store the information locally on a storage medium, such as in a file locally stored on a computer hard disk drive, and cut and paste the information into the webpage. However this may be undesirable because the information stored on the computer may not be secure from other users. In addition cutting and pasting pieces of information into a web page is also tedious and error prone.

Therefore, it would be useful to be able to automate the input of information into web pages in a flexible and secure manner such that the time it takes to input information into webpage fields is reduced and the information used can be tailored to the webpage automatically by the user. More specifically, in the Internet shopping context, it would be useful to be able to allow a shopper to have a way of securely pre-storing credit card information for the shopper's credit cards and presenting the shopper with all of their credit cards such that they can automatically input all purchase information into any Internet checkout webpage for the specific credit card selected for the purchase.

SUMMARY OF THE INVENTION

According to a first aspect of the invention a computer-usable medium is provided having control logic stored therein for an electronic wallet program that causes a computer to enable a user to make an electronic payment via a communication network. The control logic includes program code for causing the computer to provide a login interface on a display screen of the computer. The control logic also includes program code for causing the computer to receive login information inputted by the user. The control logic includes program code for causing the computer to retrieve identification information stored in a memory region of the computer, and code for causing the computer to transmit the identification information to a server computer via the communication network. In addition the control logic includes program code for causing the computer to display a personal-finance toolbar on a portion of the display screen, and program code for causing the computer to receive from the server computer, via the communication network, financial information of at least one financial account corresponding to the user. Furthermore, the control logic includes program code for causing the computer to display on the tool bar at least some of the financial information received from the server computer, and program code for causing the computer to concurrently display on the display screen the tool bar and a Web page of a Web site, wherein the Web page is a purchase page on which the user may input purchase information. The control logic also includes program code for causing the computer to automatically input the purchase information to the purchase page in response to activation of an icon on the toolbar, wherein the computer obtains the purchase information from at least one memory region of the computer.

The purchase information may include a name of the user, a code identifying a financial account of the user, and a shipping address. The identification information transmitted to the server computer can enable the server computer to identify the at least one financial account corresponding to the user.

The at least one financial account can include a credit-card account. The purchase page may also be for paying a bill from a service utility or for paying for an online shopping transaction.

The toolbar may include a plurality of modules, of which the plurality of modules may includes at least one financial-account module and at least one module corresponding to a third-party Web site. The plurality of modules may include a membership-rewards module indicating a reward level corresponding to a membership-rewards program.

Further, the control logic may also include a tenth computer-readable program code for causing the computer to increase or decrease a size of a module of the toolbar in response to activation of a sizing icon by the user, wherein an increase in the size of the module is associated with an increase in an amount of information displayed in the module, and wherein a decrease in the size of the module is associated with a decrease in an amount of information displayed in the module.

Each financial-account module may also include an icon that when activated causes purchase information be inputted to a purchase page displayed on the display screen.

A second aspect of the invention is a computer system comprising a processor and a memory storing control logic for an electronic wallet program that causes a computer to enable a user to make an electronic payment via a communication network. The control logic includes the same means as described above with respect to the computer program.

DESCRIPTION OF DRAWINGS

FIG. 6 shows various views and menus of one toolbar module in accordance with an example embodiment of the present invention.

DETAILED DESCRIPTION

Figure 1:
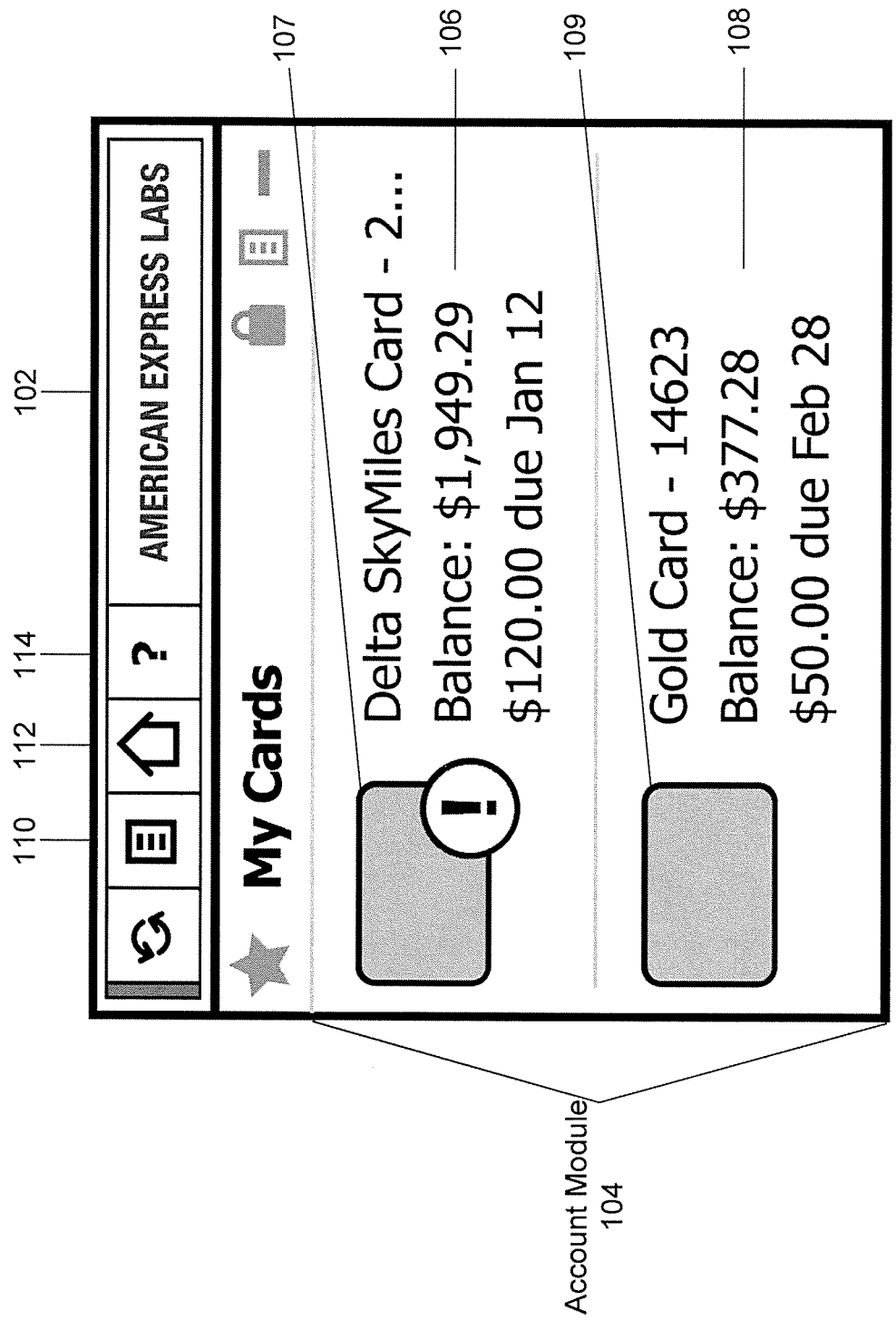
FIG. 1 shows an example of a toolbar in accordance with an example embodiment of the present invention.

The terms "user," "shopper", "consumer", "account holder", and "financial account holder" are used interchangeably throughout herein to refer to those persons or entities capable of accessing, using, being affected by and/or benefiting from the tool that the present invention provides for a module electronic wallet.

Furthermore, the terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an online merchant or the like.

With regard to use of a transaction account, users may communicate with card issuers or merchants electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

"Merchant" includes any individual, business, entity, customer, hardware and/or software that receives a card number to facilitate a transaction, whether or not in exchange for goods or services. For example, a merchant may be an online bookstore, or a local restaurant.

In general, transaction accounts may be used for transactions between the user and merchant through any suitable communication device, such as, for example, a telephone network, an intranet, the global public Internet, a point of interaction device (e.g., a point of sale (POS) device, personal digital assistant (PDA), mobile telephone, kiosk, etc.), online communications, off-line communications, wireless communications, and/or the like.

An "account," "account number," "financial transaction account number", "financial transaction account", or "account code", as used herein, may include any device, code, number, letter, symbol, digital certificate, smart chip, digital signal, analog signal, biometric or other identifier/indicia suitably configured to allow a consumer to access, interact with, or communicate with a financial transaction system. The account number may optionally be located on or associated with any financial transaction instrument (e.g., a charge, credit, debit, prepaid, telephone, smart, magnetic stripe, bar code, transponder or radio frequency card). The account number may be distributed and stored in any form of plastic, electronic, magnetic, radio frequency (RF), wireless, audio and/or optical device capable of transmitting, transferring, or downloading data from itself to a second device.

According to a first aspect of the invention a computer-usable medium is provided having control logic stored therein for an electronic wallet program that causes a computer to enable a user to make an electronic payment via a communication network. The control logic comprises a first computer-readable program code for causing the computer to provide a login interface on a display screen of the computer. The control logic also includes a second computer-readable program code for causing the computer to receive login information inputted by the user. The control logic includes a third computer-readable program code for causing the computer to retrieve identification information stored in a memory region of the computer, and a fourth computer-readable program code for causing the computer to transmit the identification information to a server computer via the communication network. In addition the control logic includes a fifth computer-readable program code for causing the computer to display a personal-finance toolbar on a portion of the display screen, and a sixth computer-readable program code for causing the computer to receive from the server computer, via the communication network, financial information of at least one financial account corresponding to the user. Furthermore, the control logic includes a seventh computer-readable program code for causing the computer to display on the tool bar at least some of the financial information received from the server computer, and an eighth computer-readable program code for causing the computer to concurrently display on the display screen the tool bar and a Web page of a Web site, wherein the Web page is a purchase page on which the user may input purchase information. The control logic also includes a ninth computer-readable program code for causing the computer to automatically input the purchase information to the purchase page in response to activation of an icon on the toolbar, wherein the computer obtains the purchase information from at least one memory region of the computer. Purchase information includes a name of the user, a code identifying a financial account of the user, and a shipping address.

Figure 4:
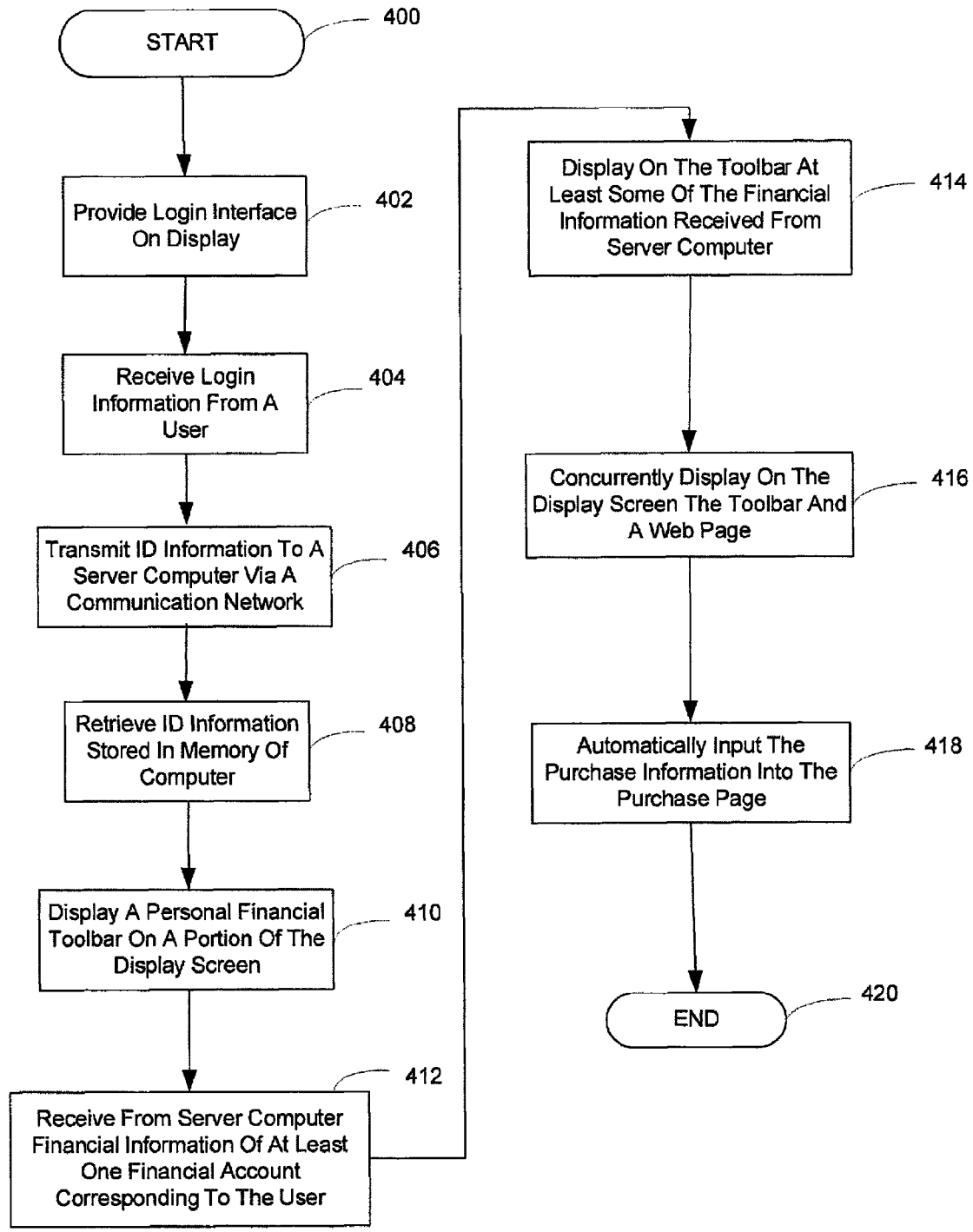
FIG. 4 shows a flow chart of a computer program in accordance with an example embodiment of the present invention.

The operation of the program is shown diagramatically in the flow chart of FIG. 4. The program starts at block 400 when a user initiates a toolbar session by executing the toolbar program. At block 402 the computer program causes the computer to provide a login interface to the user on a display screen of a computer. User authentication is required for the toolbar to function. At block 404 the user inputs identification information into the login interface and that information is received by the user computer. The identification information transmitted to the server computer enables a server computer to identify the at least one financial account corresponding to the user.

Figure 5:
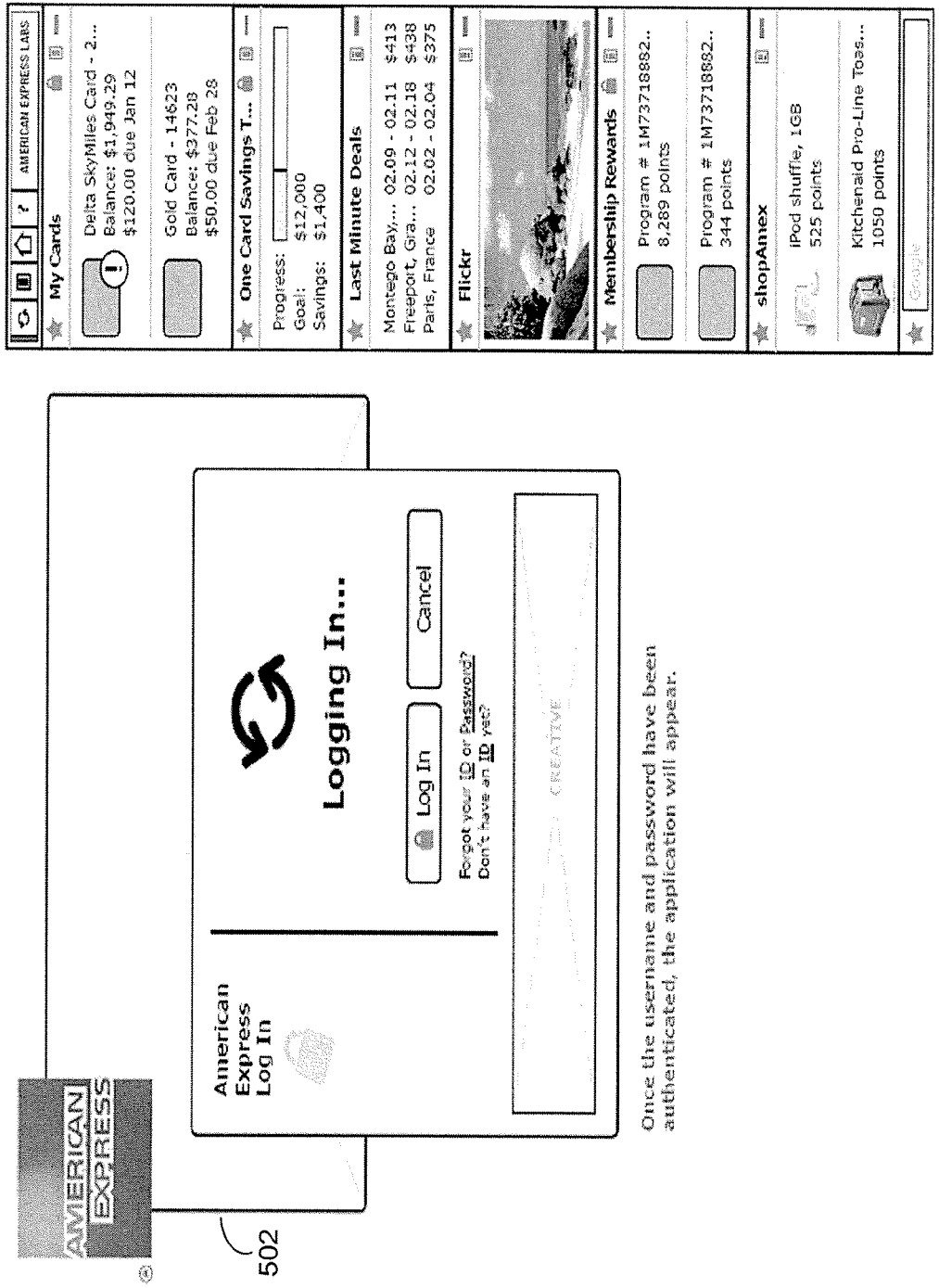
FIG. 5 shows an example of an authentication screen and toolbar in accordance with another embodiment of the invention.

At block 406 the login information is transmitted to the server computer via a communication network. The user is authenticated by the server at block 408, and is graphically shown in FIG. 5 by a login status window 502 on the display. Once the login information is authenticated a signal is sent back from the server computer to the user's computer via a communication network to grant the program access to personal information stored in a computer readable memory of the user computer and to cause the computer to display on the tool bar at least one account summary respectively corresponding to at least one financial account corresponding to the user's identification information. The personal information is the user's personal information that will be used to populate fields of a merchant's checkout web page 204, such as that of FIG. 2 and the account summary information is information about a financial or other account for which corresponds to the user. For example, the personal information includes the information stored corresponding to the financial account objects (106 and 107) described above with respect to FIG. 1. In addition, when the user is authenticated a string of information is sent from the server computer that includes at least personal financial account information corresponding to objects shown on the toolbar. In one embodiment, one of the objects corresponds to a credit-card account.

FIG. 1 shows an illustration of one embodiment of a modular personal finance toolbar 102 displaying information corresponding to at least one financial account. The toolbar 102 can be comprised of one or more types of modules (e.g., 104) that may further contain one or more objects (106 and 108). In the embodiment shown in FIG. 1, the toolbar 102 displays financial information of at least one financial account corresponding to a user of the toolbar, the information being received from a server computer, discussed below. The toolbar displays at least one object that includes account summary information of a corresponding financial account, and displays at least one module corresponding to a third-party Web site. For example FIG. 1 illustrates a toolbar 102 containing one account module 104 that contains two account module objects (106 and 108), shown, for example, as two credit card accounts. These credit card objects are shown along with the financial account information received, such as, for example, balance information, minimum payment, and payment due dates. In place of, or in addition to, the name of the accounts being listed, a picture or icon may also be present to identify the account, such as for example, a picture of a physical credit card.

As the term is used herein, a module is an interface element that a computer user interacts with, such as a window or a text box. These modules may be qualified as virtual to distinguish them from their physical counterparts, e.g., virtual buttons that can be clicked with a mouse cursor, vs. physical buttons that can be pressed with a finger (but not a mouse).

In FIG. 1, two objects (106 and 108) of the account module 104 are configured with credit card account information and personal purchase information stored locally and remotely corresponding to each object (106 and 108) to automatically fill in the corresponding fields in the web page when such function is activated by the user. These objects may contain information that has been input by the user into a profile corresponding to the object, the user, and an account held in the user's name, such as, for example, a credit card account. The object may display information transferred from a server computer through a communication network upon authentication to the server or at other certain times thereafter. In this way, information from such a server may be combined with user input information and displayed or otherwise used by the user during the period of time the user is logged into the server.

In one embodiment of the toolbar, at least one financial account object includes an icon (e.g., 107, 109), which, when activated, causes purchase information to be input into a purchase web page (not shown) shown on the user input display. The purchase page may be for paying a bill, such as, for example, from a service utility. The purchase page may also be for paying for completing an online shopping transaction. The information contained in the profile can be transferred to the corresponding field of the purchase web by having a user click and drag the object from the module, and drop the icon onto the fillable web page. All fields for which information has been stored corresponding to the object selected will then be inserted into the web page fields.

In one embodiment the objects correspond to credit card accounts held by the user. Upon logging into an authentication server, the server computer transfers the personal financial information, such as, for example, credit card account information, usable by the toolbar, including, card name, card number, current balance, and reward points earned. Based upon the user's preferences, as input and stored into the toolbar program, some or all of this information may be displayed on the toolbar as an object. A user can create a profile, stored locally on the user computer, for each of these credit card accounts and input and store personal information that they choose to associate with the account for the purpose of inputting information into fillable web pages.

Figure 2:
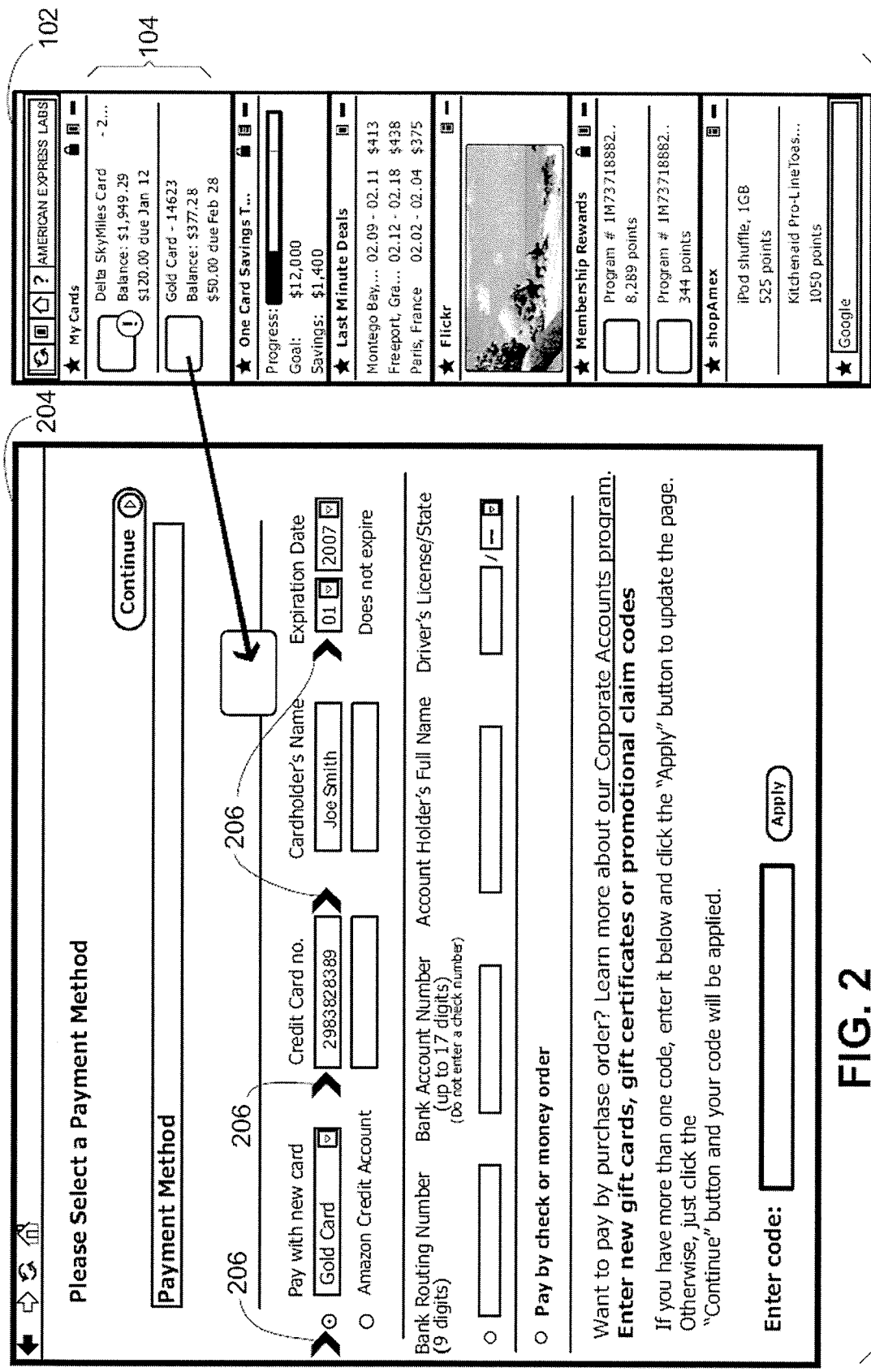
FIG. 2 shows an example of a toolbar in accordance with an example embodiment of the present invention in conjunction with a website.

Referring to FIG. 2, in one embodiment, the toolbar 102 automatically appears when a purchase web page 204 of a web site is viewed, which contains one or more input fields 206 recognized by the computer program as a fillable purchase information field. For example, the purchase information may include a name of the user, a code identifying a financial account of the user, and a shipping address. Upon recognizing that one or more fields of the webpage are fillable, the program causes the toolbar 102 to appear to display a list of accounts 104 and their corresponding balances. These accounts may be, for example, credit cards, debit cards, checking accounts, or stored value cards. This list is only exemplary, and is not meant to limit the scope of the type of accounts that may be used.

The appearance of the toolbar can be modified by a user interacting with the computer program. Modules of the toolbar can be added, deleted, or otherwise modified by selecting the link to the module landing web page button located on the top of the toolbar shown in FIG. 1. Selecting this link will direct the toolbar to a module landing webpage, where the user can make changes to the toolbar and any information stored for certain modules. In addition, the toolbar may contain control buttons, including a refresh button, an options menu button, a module landing page link button, and a help button.

Figure 3:
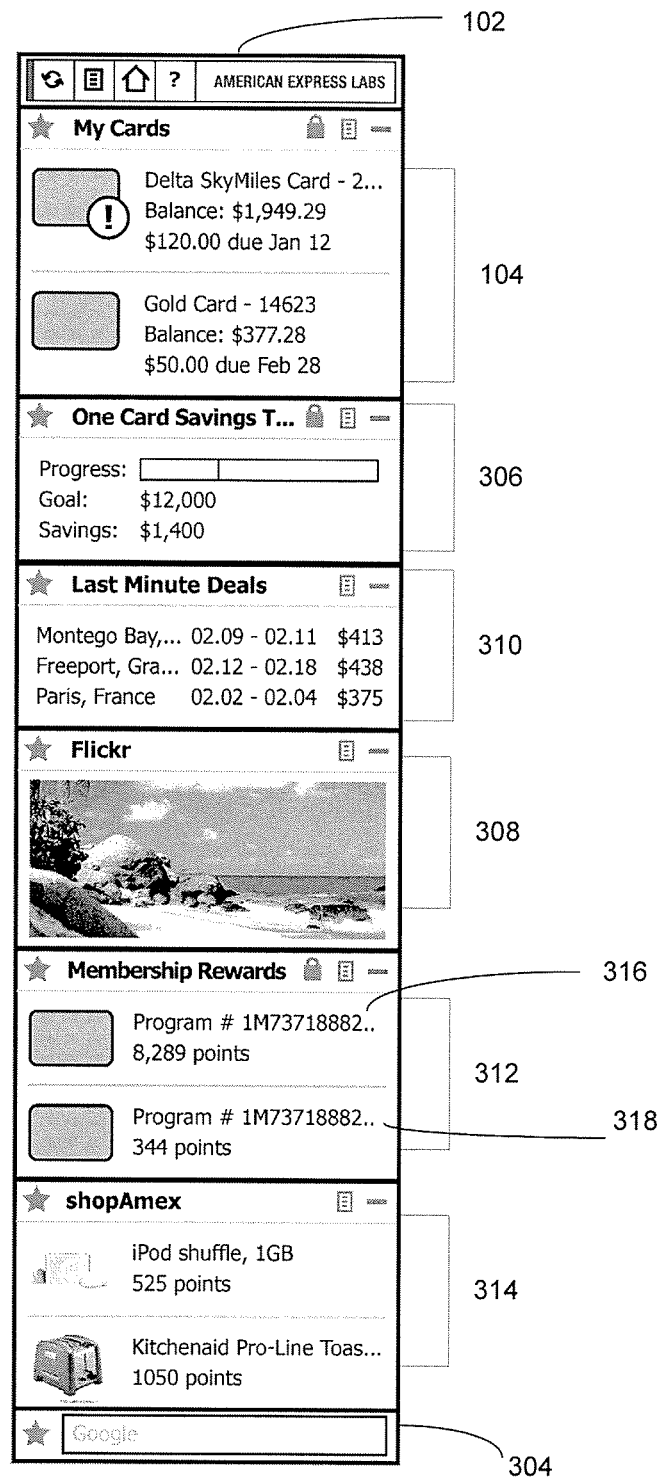
FIG. 3 shows another example of a toolbar in accordance with an example embodiment of the present invention.

FIG. 3 shows another embodiment of a toolbar 300 that includes a plurality of modules, such that at least one module is a financial-account module 302 and at least one module 304 corresponds to a third party web site. In this embodiment for example, the toolbar includes an account module 302, a savings tracker module 306, a travel module 308, a travels deal module 310, a membership rewards module 310, a shopping module 314, and an Internet search module 304.

The membership rewards module 312 indicates a reward level corresponding to a membership rewards program such as, for example, a credit card member rewards program. In the membership rewards module shown in FIG. 3, the two objects 316 and 318 indicate that the user has accumulated 8,289 and 344 reward points, for the respective accounts listed. The rewards information is transferred to the user computer upon user authentication and possibly at certain other times thereafter while the user is logged into the server, such as upon after completing a purchase transaction using a credit card for which reward points are awarded for the purchase.

In one embodiment of the toolbar, the size of a toolbar module can be increased or decreased in response to activation of a sizing icon located in or on the toolbar by the user. When the size of a module is increased the amount of information displayed in the module also increases and when the size of a module is decreased the amount of information displayed in the module decreases.

A second aspect of the invention is directed to a computer system with control logic stored therein that facilitates an authenticated user to make an electronic payment via a communication network. The control logic comprises a first computer-readable program code for causing the server system to provide an installation program to a user computer used by the user, wherein the installation program enables the user to install on the user computer a toolbar program for a personal-finance toolbar, and wherein the personal-finance toolbar includes a module that displays account information of a financial account. The module includes an icon that when activated causes the user computer to obtain payment information from at least one memory region of the user computer and to automatically input the payment information to a payment page of a Web site. The control logic also comprises a second computer-readable program code for causing the server system to receive from the user computer identification information corresponding to the user, a third computer-readable program code for causing the server system to obtain financial information of a financial account corresponding to the user, based on the identification information received from the user computer, and a fourth computer-readable program code for causing the server system to provide the financial information to the toolbar program. The toolbar program causes at least some of the financial information to be included in a section of the personal-finance toolbar displayed on a display screen of the user computer.

The present invention (i.e., the system 1100, or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 11:
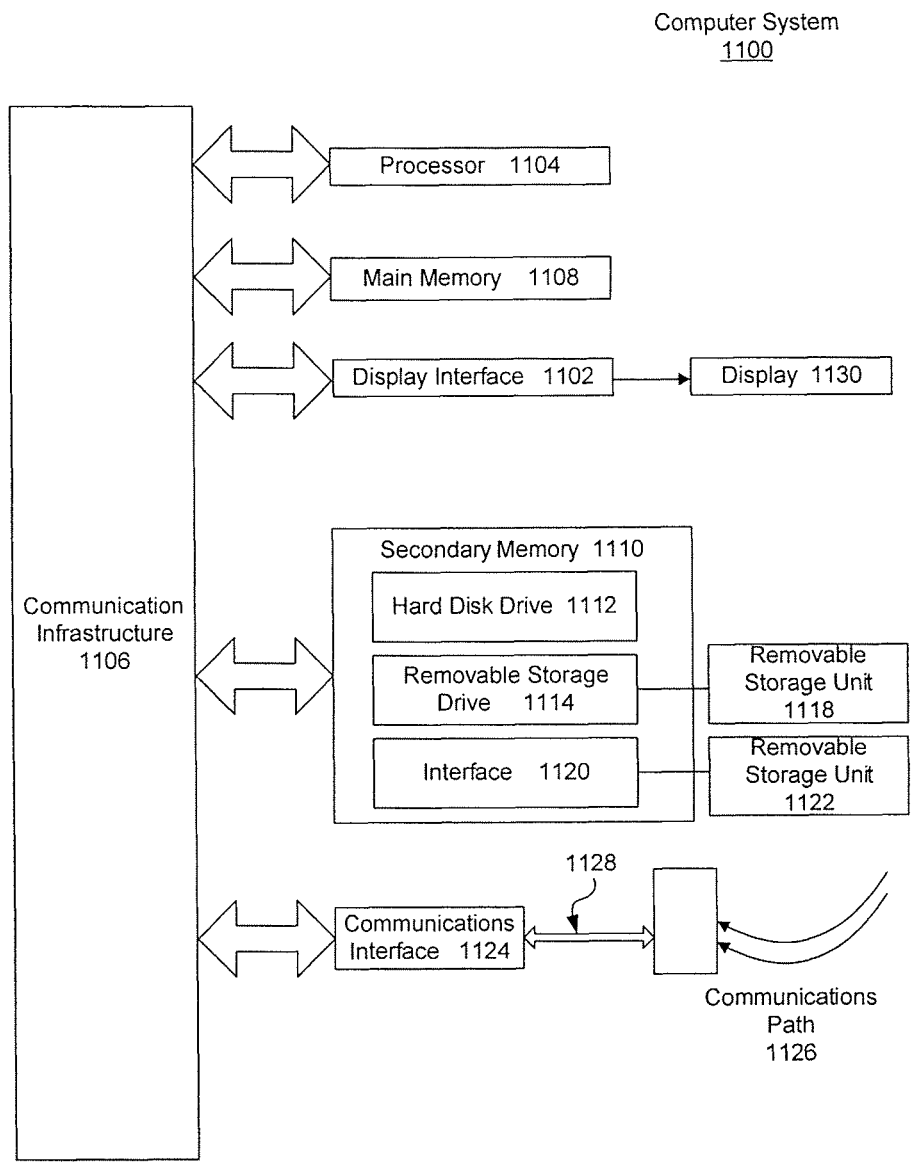
FIG. 11 shows a system in accordance with an example embodiment of the present invention.

In fact, in one embodiment, the invention is directed toward one or more computer systems capable of carrying out the functionality described herein. An example of a computer system 1100 is shown in FIG. 11.

The computer system 1100 includes one or more processors, such as processor 1104. The processor 1104 is connected to a communication infrastructure 1106 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 1100 can include a display interface 1102 that forwards graphics, text, and other data from the communication infrastructure 1106 (or from a frame buffer not shown) for display on the display unit 1130.

Computer system 1100 also includes a main memory 1108, preferably random access memory (RAM), and may also include a secondary memory 1110. The secondary memory 1110 may include, for example, a hard disk drive 1112 and/or a removable storage drive N14, representing a floppy disk drive, a magnetic tape drive, an optical disk drive, etc. The removable storage drive 1114 reads from and/or writes to a removable storage unit 1118 in a well known manner. Removable storage unit 1118 represents a floppy disk, magnetic tape, optical disk, etc. which is read by and written to by removable storage drive 1114. As will be appreciated, the removable storage unit 1118 includes a computer usable storage medium having stored therein computer software and/or data.

In alternative embodiments, secondary memory 1110 may include other similar devices for allowing computer programs or other instructions to be loaded into computer system 1100. Such devices may include, for example, a removable storage unit 1122 and an interface 1120. Examples of such may include a program cartridge and cartridge interface (such as that found in video game devices), a removable memory chip (such as an erasable programmable read only memory (EPROM), or programmable read only memory (PROM)) and associated socket, and other removable storage units 1122 and interfaces 1120, which allow software and data to be transferred from the removable storage unit 1122 to computer system 1100.

Computer system 1100 may also include a communications interface 1124. Communications interface 1124 allows software and data to be transferred between computer system 1100 and external devices. Examples of communications interface 1124 may include a modem, a network interface (such as an Ethernet card), a communications port, a Personal Computer Memory Card International Association (PCMCIA) slot and card, etc. Software and data transferred via communications interface 1124 are in the form of signals 1128 which may be electronic, electromagnetic, optical or other signals capable of being received by communications interface 1124. These signals 1128 are provided to communications interface 1124 via a communications path (e.g., channel) 1126. This channel 1126 carries signals 1128 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 1114, a hard disk installed in hard disk drive 1112, and signals 1128. These computer program products provide software to computer system 1100. The invention is directed to such computer program products.

Computer programs (also referred to as computer control logic) are stored in main memory 1108 and/or secondary memory 1110. Computer programs may also be received via communications interface 1124. Such computer programs, when executed, enable the computer system 1100 to perform the features of the present invention, as discussed herein. In particular, the computer programs, when executed, enable the processor 1104 to perform the features of the present invention. Accordingly, such computer programs represent controllers of the computer system 1100.

In implementing the invention using software, the software may be stored in a computer program product and loaded into computer system 1100 using removable storage drive 1114, hard drive 1112 or communications interface 1124. The control logic (software), when executed by the processor 1104, causes the processor 1104 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

In one embodiment of the second aspect of the invention the control logic of the computer-usable medium also includes program code for causing the system to authenticate the identification information received from the user computer prior to providing the financial information to the toolbar program.

In one embodiment personal information, including preference information, is stored as encrypted data in order, among other things, to prevent unauthorized access to the user's personal information stored on the computer readable storage medium. The information cannot be edited or stored unless the user has been authenticated to the server computer from the main login screen, described above.

Once the user is authenticated to the server, the encrypted personal information stored on the computer readable storage medium can be accessed by the program. As a benefit, for example, if personal information was stored on a hard disk drive of a user computer and the computer was stolen, the information would be inaccessible unless the thief authenticated himself to the server computer using the user's login and password.

A personal financial toolbar is displayed on a portion of the display screen and displays at least some personal financial data of the user received from the server computer as well as at least some of the personal information stored on the user's computer and retrieved. The data includes financial information of at least one financial account of the user. The financial information of at least one financial account may include, for example, the account balance of a credit card at the time of the user login to the server. Therefore, the current account balance, minimum payment, and payment due date may be displayed on the toolbar.

Proper server authentication thus allows the toolbar both to receive current financial account information corresponding to the user's configured accounts and also to access the personal information that is stored on the user's computer that can be used to automatically fill in fields in web page forms. Absent user authentication, no financial or personal information is accessible to a user, rendering the toolbar displaying the user's personal information inaccessible to any user without the user's log in information.

In another embodiment of the toolbar, during a period of inactivity, the program can stop executing and does not permit a user to automatically input personal information into fillable fields until the user logs into the server computer again. Furthermore, once a user logs into the server computer and the server computer transmits the financial account information, communication of financial account information between the server and the user computer is halted, preventing the user or any other person from accessing the main account web page. In one embodiment of the computer program the financial account information displayed at user login to the server computer remains static until the user stops the program and logs into the server computer again. In yet another embodiment of the computer program, as long as the user's session does not time-out (that is, there does not occur a period of inactivity equal to a certain length of time), communication between the user computer and the server computer continues so that the financial information displayed on the tool bar can be updated, such as, for example, at predefined intervals of time. In this way, for example, as a user completes purchase transactions, the account balances shown on the account module display will reflect the new charges to the accounts.

In one embodiment of the computer program, the program can be configured to minimize the toolbar and enter a standby mode. While in the standby mode a visual indicator can be present on a portion of the display. During the period of inactivity this indicator can change state or disappear indicating a timeout, and therefore, that the user is no longer able to use the toolbar without authenticating himself with the server computer again. In addition, while in standby mode the toolbar program can detect whether or not a web page window being viewed on the display contains fields that can be filled using information from the toolbar. If the program detects that a web page contains fillable fields, the standby mode ends as indicated by a change of state of the visual indicator, such as, for example, by changing color or shape.

In one instance, the toolbar may be minimized and not viewable on the user's display. Such a mode is considered a standby mode. In this mode, a user is authenticated by the server and the session has not timed out. If a user thereafter opens a web browser and views a web page containing fields that are recognized by the computer program as fields that can be filled with information from the toolbar, the user will notice that a graphical icon on the user display may begin to blink, prompting the user to select the icon, which will in turn display the toolbar in a portion of the display. In one embodiment of the computer program, when a web page is displayed that contains fields that are recognized as fillable with information from the toolbar as is shown, for example, in FIG. 2, the user will be alerted that such fields can be automatically input using the toolbar. Alternatively, in another case, if a user is already viewing a web page containing fillable fields that are recognized by the computer program as fields that can be filled with information from the toolbar and the toolbar is in standby, the toolbar automatically appears on the display without prompting or intervention by the user.

In one embodiment of the computer program, when the toolbar and a web page containing fillable fields are concurrently displayed the program can set the color of the fillable fields to a color other than that defined by the mark-up language of the webpage, to indicate to the user that such fields can be automatically filled using the toolbar. For example, if the web page has been designed to display the input fields as white, the computer program can set the color as blue, indicating that the fields are automatically fillable using the toolbar.

If a user decides to fill in the web page form using the toolbar's automatic input feature, the user can fill in the fields in one of two ways. The first way to use the toolbar to automatically input information into the fillable web page form is to click and drag one of the financial account icons into the webpage and drop it on the webpage window. All of the fields on the form for which corresponding information exists, either from the server computer, or from the computer program retrieval of data from the use computer input by a user corresponding to the icon selected, will be filled into the web page form. Alternatively, any field for which information does not exist will not be automatically input into the form, and those fields will remain blank unless the user inputs those fields manually. The information filled into the fields by the toolbar program can be overwritten by selecting another financial account from the financial account module.

The second way to use the toolbar to automatically input information into the fillable web page form is to select the icon on the toolbar, such as by, for example, double clicking on the icon using a computer mouse or typing a series of keystrokes on a keypad device.

With regard to both methods of automatically inputting information into the fillable fields, a user can manually edit individual fields in the ordinary way after the information is automatically input.

The toolbar may also be used to facilitate automatic bill payment, such as, for example, utility bills, as is shown in the example in FIG. 6. With the toolbar visible in the display a user selects the "Bill Payments" module 602 which will then expand the module and display the list of bill payees 604 that have been established by the user along with the outstanding bill balances and payment due dates as is shown in FIG. 6. The payee list is transferred and updated upon user authentication with the server. The list of payees can be limited by the user by inputting preference information into the toolbar and storing that information along with the other user preference information. The payment amount and due date information are supplied from the payee to the server computer and transferred to the user computer upon login to the toolbar along with the other financial account information. Such payment information is transmitted to the user computer and displayed upon login along with the user's other financial information, described above with respect to the account module 104. Using the options menu 614 for the bill payments module 602, the user can then choose to view and pay on or more bills and view a display window 606, which lists one or more of the payees along with the corresponding amounts from an account 608 that has been established for paying the bill. For example, the user may establish one of the financial accounts listed in the account module to pay one or more of the bills. As an example, the user can select an American Express Gold Card to pay a telephone bill or link directly to a bank account, such as a savings or checking account as is shown in FIG. 6.

Figure 7:
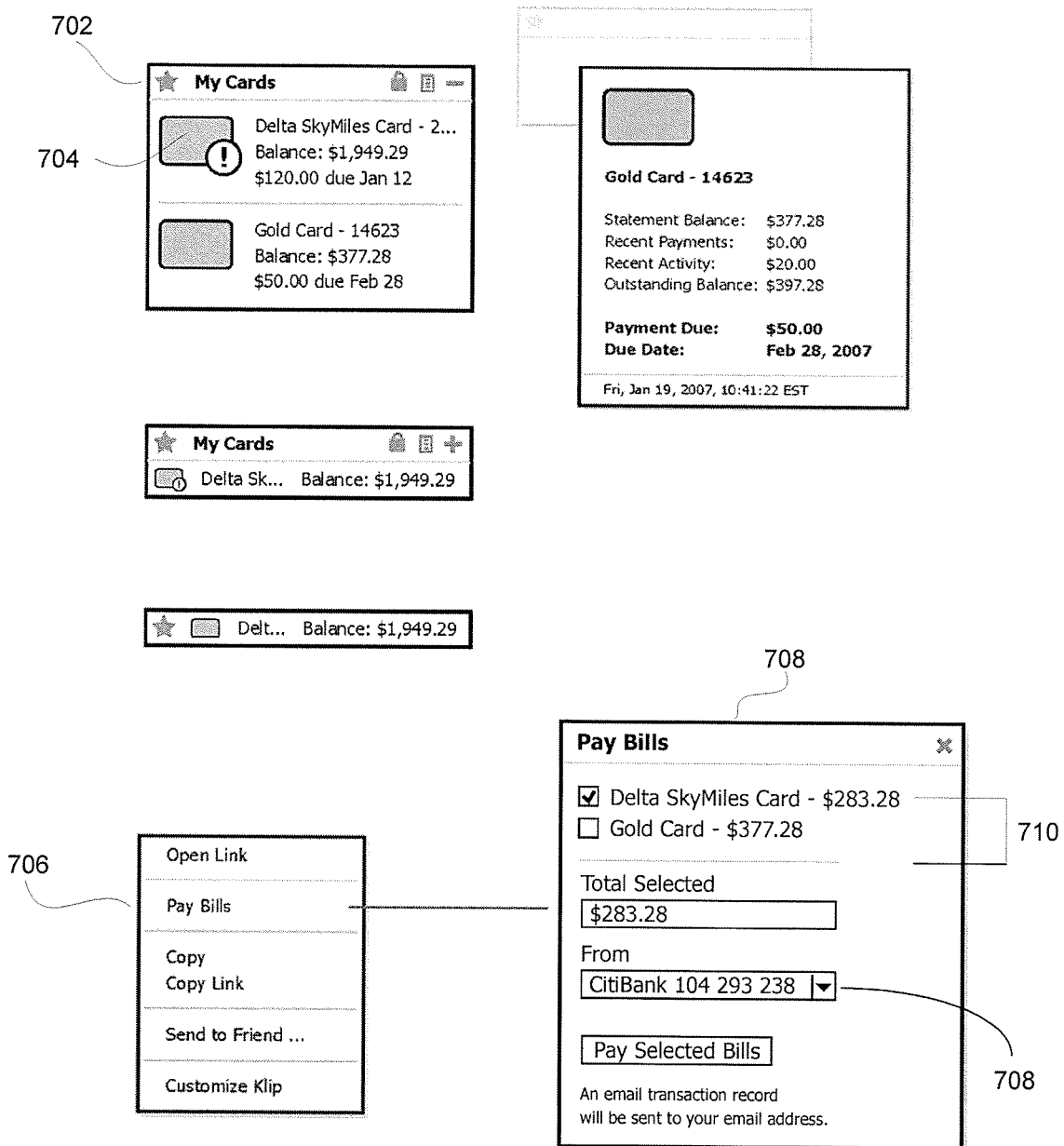
FIG. 7 shows various views and menus of another toolbar module in accordance with an example embodiment of the present invention.

The user can also pay a credit card bill using the toolbar from, for example, a linked financial account, such as a bank savings or checking account, to pay the balance, or is shown in FIG. 7. In one embodiment a small view 716 of the user's credit cards is displayed on the toolbar. A user desiring additional detail about the credit card accounts can expand the account objects to show intermediate detail 714 or full detail of all cards 702. A user can select the credit card icon 704 from the account module 702, which will bring up a window 718 providing further information for that financial account. Using the options menu 706 for the account module, a user can choose to pay credit card or other charges related to the listed accounts in the account module. The "Pay Bills" window 708 allows the user to select the credit card account(s) 710 for which payment will be made (accounts to be credited) and the account 712 from which funds will be drawn (account to be debited).

Figure 8:
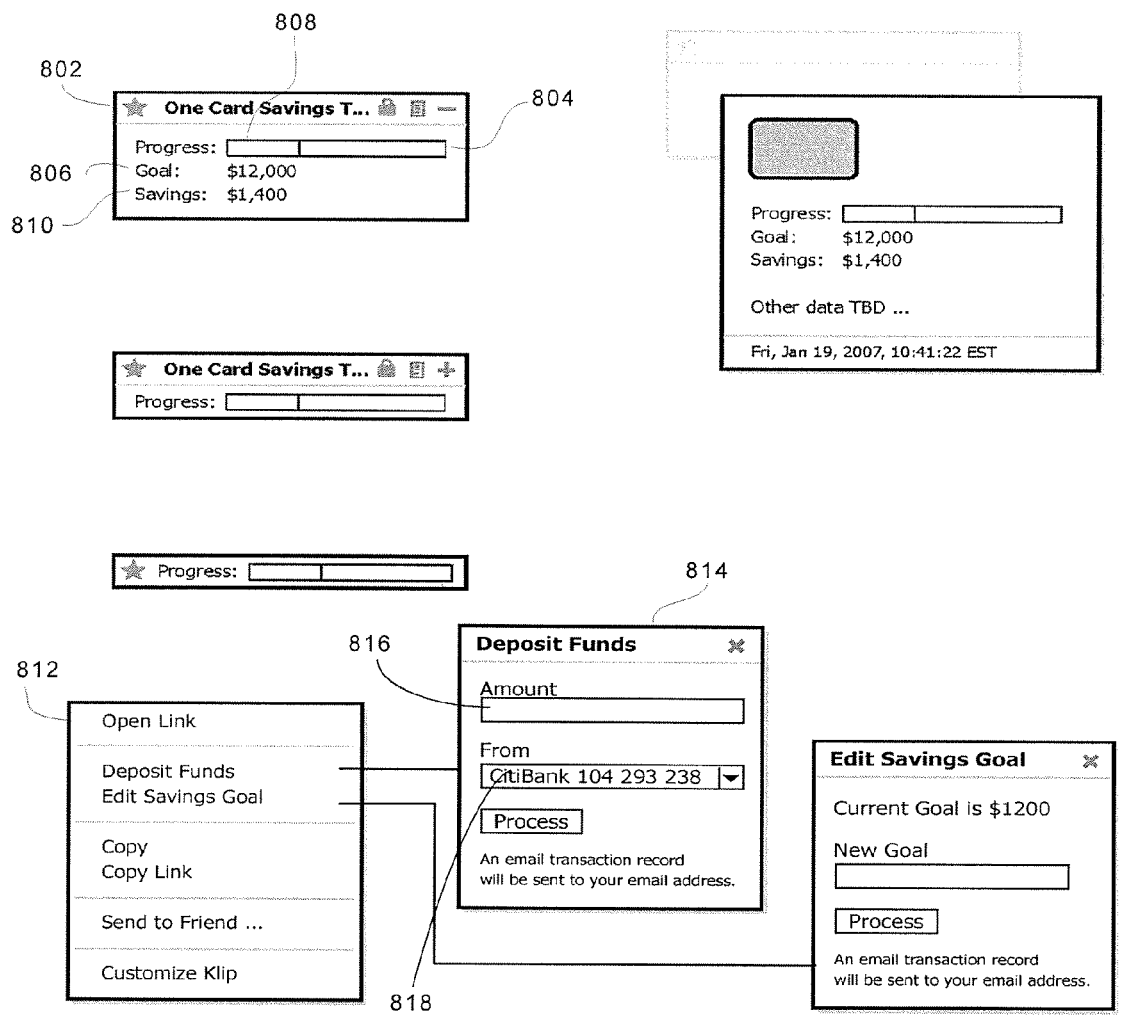
FIG. 8 shows various views and menus of yet another toolbar module in accordance with an example embodiment of the present invention.

FIG. 8 shows another embodiment of the toolbar, which includes a savings tracker module 802. The savings tracker is used to track the progress of saving money to a linked financial account, such as, for example, a bank savings account. At least some of the information displayed in this module is transferred from the server upon user authentication. Information such as the goal amounts are preferences stored locally on the user's computer. In the embodiment shown in FIG. 8, a progress bar 804 shows the visual indication of the amount of the total savings goal 806 accomplished as the shaded portion 808. In addition the savings goal 806 and the current amount of money saved 810 are displayed in the module. A user may make deposits or additions to the savings using the savings tracker module by selecting the module and selecting "Deposit Funds" from the item menu 812. Thereafter, the user can enter the desired amount 816 of savings and the account 818 the money will be taken from into the Deposit Funds window 814. The linked financial account from which money will be transferred from is an account that has been selected by the user as a linked account on the server computer, and for which electronic funds transfer has already been established. In the example shown in FIG. 8, the user has already configured an account on the server computer to use a "CitiBank" account 818 from which to transfer money for savings deposits. In addition, the user can modify the savings goal 806 using the savings tracker module menu options 812 and save them on the user's computer.

Figure 9:
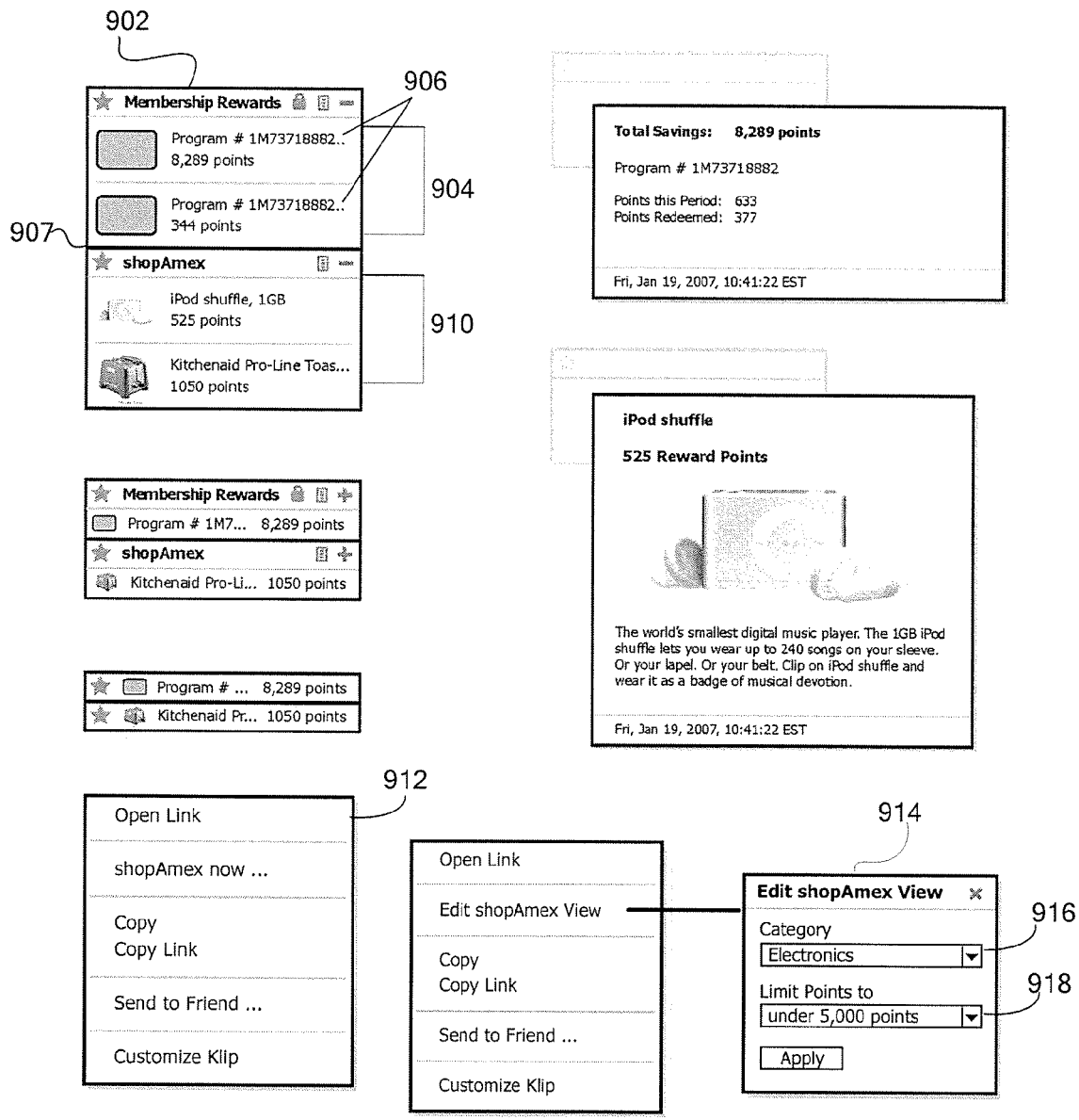
FIG. 9 shows various views and menus of two toolbar modules in accordance with an example embodiment of the present invention.

In another embodiment, the toolbar contains a rewards module shown as 902 in FIG. 9 that displays one or more reward program accounts 904 in which the user is enrolled. The amount of points for each reward program account are transferred to the user computer upon user authentication. For example, a user may be enrolled in a credit card reward program that offers a certain number of points for a corresponding amount of money charged to a credit card. Such points would accumulate when purchases were made using the associated credit card and those points would be displayed in the toolbar for later redemption. The toolbar can also allow a user to link to a web site where the rewards points could be redeemed for goods, services, or for money.

The rewards program module may be displayed in conjunction with a shopping module 908 that displays items in categories that the user has configured based on his or her preferences and that can be redeemed for less than the number of points the user has configured. The items displayed are refreshed periodically while the user is logged into the toolbar, or upon login. In one embodiment, the information displayed in the rewards program module is updated upon logging into the toolbar and upon further query of a shopping server based upon the user preferences and upon the user's reward points.

For example in FIG. 9 the membership rewards module 902 and the shopAmex module 908 are shown vertically adjacent to each other. In the membership rewards module 902 membership rewards accounts 904 are listed with the account number and the point balance 906, while the shopAmex module 908 displays two items 910 that can be obtained through membership point redemption. Using the menu options 912 and the "Edit shopAmex View" window 914 a user can modify preferences as to the category 916 and maximum redemption point limit 918 of the items listed and/or displayed in the shopping window. The user can edit preferences for the items listed in the shopAmex module by selecting a category of items to display and the maximum single item point limit. Such preferences are stored locally on the user's computer. Upon login to the toolbar, the new settings will take effect and the display will be updated with information based, in part, on the updated user preferences.

In another embodiment, the toolbar may include a travel deals module 1002 that displays prices for travel related services for destinations that the user has established preferences for using the toolbar. Upon authentication to the server, the information displayed in the travel deals module is refreshed with updated information, for example, by sending a query through the internet to at least one travel server and routing the results back through the at least one travel server to the user computer to be displayed in the travel deals module.

The user can change the destinations displayed in the travel deals module by using the menu options for the travel deals module. A user may configure which destinations are shown in the travel deals module 1002 by using the item menu 1008 and selecting the departure city 1012 and then the destination(s) 1014 in the change destinations window. For example, in the "Travel Deals" module 1002 shown in FIG. 10 a list of destinations, travel dates, and prices is shown. The user can click on any one of the listed travel itineraries to obtain additional information in a window 1006, including the total cost and a description of travel service inclusions. As mentioned above, in one embodiment the information displayed in the travel deals module is updated once at user login to the server upon execution of the toolbar program.

Figure 10:
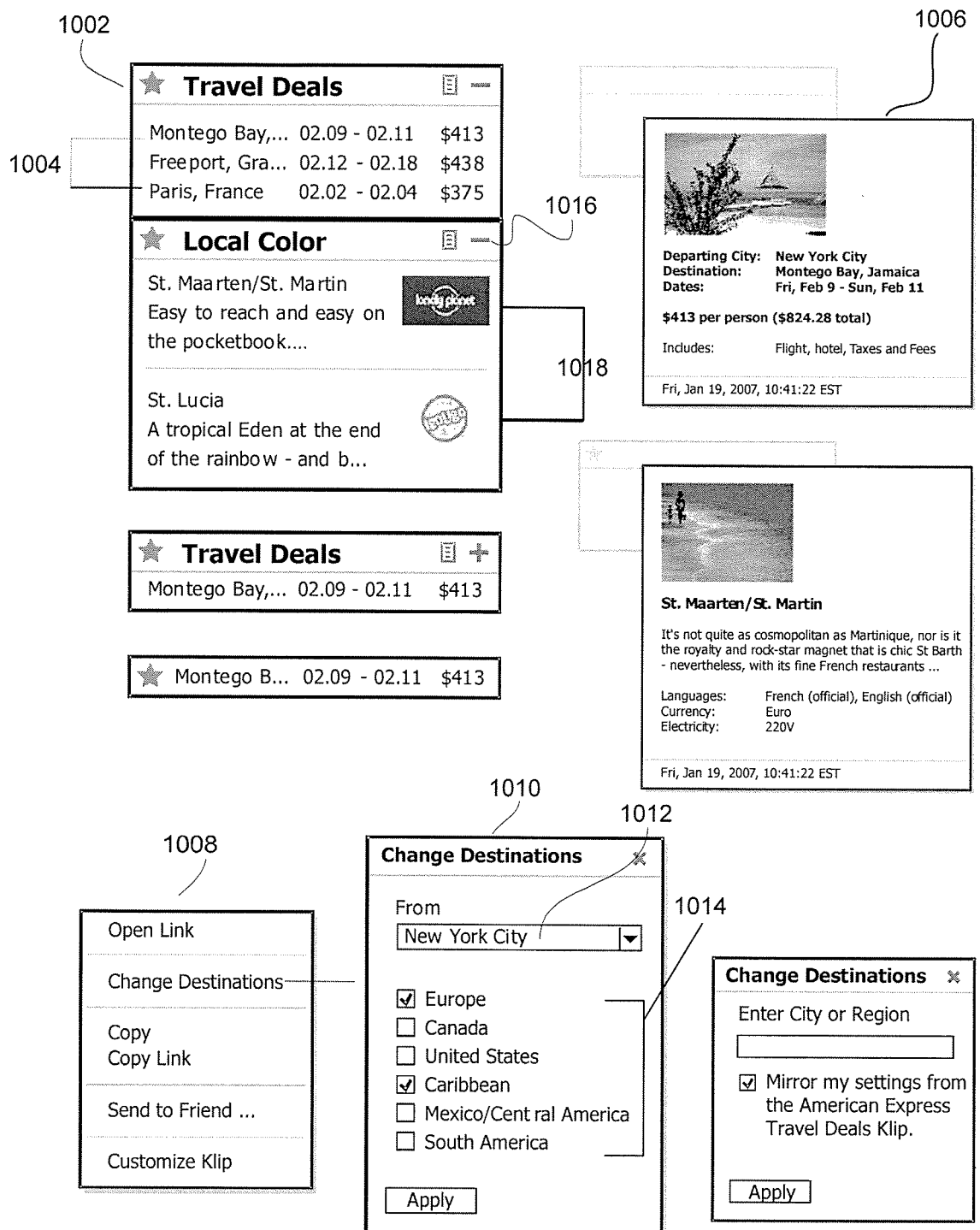
FIG. 10 shows various views and menus of two other toolbar modules in accordance with an example embodiment of the present invention.

Also shown in FIG. 10, in addition to the travel deals module 1002, the toolbar may also include a travel location module 1016 for providing information 1018 about places based on user preference settings. In addition the user can configure the module to display travel information about one or more of the places listed in the travel deals module 1002. For example, the user may select the "local color" module 1016 to configure the information displayed using the corresponding item menu. The user can select a city or a region and can also mirror the settings from the "travel deals" module if also included in the toolbar.

Referring again to FIG. 3, the toolbar can also include a link to an external web site 304, such as, for example, an Internet search engine. A user who only views the toolbar and does not have a web browser executing can launch the web browser and an Internet search directly from the toolbar by inputting the search string and starting the search.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A non-transitory, tangible computer-readable storage medium having stored thereon a plurality of instructions for completing a transaction, the plurality of instructions, when executed by a computer based system for facilitating payments, are configured to cause the computer based system to perform operations, comprising:

securely storing, by the computer based system, identification information in a memory region of the computer based system;

transmitting, by the computer based system, authentication login information via a communication channel to an authentication system;

receiving, by the computer based system and via the communication channel, data associated with a particular transaction account based upon the authentication login information being validated by the authentication system;

detecting, by the computer based system, that a Web page comprises a field to be populated using information from a personal-finance toolbar;

in response to detecting that the Web page comprises the field to be populated, concurrently displaying, by the computer based system, the personal-finance toolbar on a portion of a display and the Web page of a Web site, wherein the Web page is a purchase page;

in response to detecting that the Web page comprises the field to be populated, highlighting the field to be populated in a distinguishing visual indicator, wherein the personal-finance toolbar displays both an icon to identify the particular transaction account and at least a portion of an account code associated with the particular transaction account, wherein the personal-finance toolbar includes a plurality of modules, wherein the plurality of modules comprises a transaction account module, a third-party Web site module and a membership-rewards module indicating a reward level corresponding to a membership-rewards program, wherein in response to activation of a sizing icon a size of a module of the plurality of modules is adjusted, wherein an increase in the size of the module of the plurality of modules is associated with an increase in an amount of information displayed in the module of the plurality of modules, and wherein a decrease in the size of the module of the plurality of modules is associated with a decrease in an amount of information displayed in the module of the plurality of modules; and automatically inputting, by the computer based system, the data to the field to be populated using information from the personal-finance toolbar on the Web page in response to activation of the icon displayed on the personal-finance toolbar identifying the particular transaction account associated with the data, wherein a system of the purchase page is configured to contact an issuer of the particular transaction account issuer for payment to complete the transaction.

2. The computer readable storage medium according to claim 1, further comprising displaying on the personal-finance toolbar an account summary corresponding to the particular transaction account.

3. The computer readable storage medium according to claim 2, wherein the particular transaction account is associated with a transaction instrument.

4. The computer readable storage medium according to claim 3, wherein each transaction account module includes an icon that causes purchase information be inputted to the purchase page displayed on the display in response to being activated.

5. A computer based system, comprising:
computer network communicating with a memory;
the memory communicating with a processor for facilitating payments; and
the processor, when executing a computer program for completing a transaction, is configured to:
securely storing, by the processor, identification information in a memory region of the computer based system;
transmitting, by the processor, authentication login information via a communication channel to an authentication system;
receiving, by the processor and via the communication channel, data associated with a particular transaction account based upon the authentication login information being validated by the authentication system;
detecting, by the processor, that a Web page comprises a field to be populated using information from a personal-finance toolbar;
in response to detecting that the Web page comprises the field to be populated, concurrently displaying, by the computer based system, the personal-finance toolbar on a portion of a display and the Web page of a Web site, wherein the Web page is a purchase page;
in response to detecting that the Web page comprises the field to be populated, highlighting the field to be populated in a distinguishing visual indicator,
wherein the personal-finance toolbar displays both an icon to identify the particular transaction account and at least a portion of an account code associated with the particular transaction account, wherein the personal-finance toolbar includes a plurality of modules, wherein the plurality of modules comprises a transaction account module, a third-party Web site module and a membership-rewards module indicating a reward level corresponding to a membership-rewards program, wherein in response to activation of a sizing icon a size of a module of the plurality of modules is adjusted, wherein an increase in the size of the module of the plurality of modules is associated with an increase in an amount of information displayed in the module of the plurality of modules, and wherein a decrease in the size of the module of the plurality of modules is associated with a decrease in an amount of information displayed in the module of the plurality of modules; and
automatically inputting, by the processor, the data to the field to be populated using information from the personal-finance toolbar on the Web page in response to activation of the icon displayed on the personal-finance toolbar identifying the particular transaction account associated with the data, wherein system of the purchase page is configured to contact an issuer of the particular transaction account issuer for payment to complete the transaction.

6. The computer based system according to claim 5, wherein the purchase information includes a name of a user, a code identifying the particular transaction account of the user, and a shipping address.

7. The computer based system according to claim 5, wherein the identification information transmitted enables the computer based system to identify the particular transaction account.

8. The computer based system according to claim 5, wherein the display on the personal-finance toolbar includes an account summary corresponding to the particular transaction account.

9. The computer based system according to claim 8, wherein the particular transaction account is associated with a transaction instrument.

10. The computer based system according to claim 5, wherein the purchase page is for paying a bill from a service utility.

11. The computer based system according to claim 5, wherein the purchase page is for paying for an online shopping transaction.

12. The computer based system according to claim 5, wherein each transaction account module includes an icon that causes purchase information be inputted to the purchase page displayed on the display screen in response to being activated.

13. A method comprising:
securely storing, by a computer based system for facilitating payments, identification information in a memory region of the computer based system;
transmitting, by the computer based system, authentication login information via a communication channel to an authentication system;
receiving, by the computer based system and via the communication channel, data associated with a particular transaction account based upon the authentication login information being validated by the authentication system;
detecting, by the computer based system, that a Web page comprises a field to be populated using information from a personal-finance toolbar;
in response to detecting that the Web page comprises the field to be populated, concurrently displaying, by the computer based system, the personal-finance toolbar on a portion of a display and the Web page of a Web site, wherein the Web page is a purchase page;
in response to detecting that the Web page comprises the field to be populated, highlighting the field to be populated in a distinguishing visual indicator,
wherein the personal-finance toolbar displays both an icon to identify the particular transaction account and at least a portion of an account code associated with the particular transaction account, wherein the personal-finance toolbar includes a plurality of modules, wherein the plurality of modules comprises a transaction account module, a third-party Web site module and a membership-rewards module indicating a reward level corresponding to a membership-rewards program, wherein in response to activation of a sizing icon a size of a module of the plurality of modules is adjusted, wherein an increase in the size of the module of the plurality of modules is associated with an increase in an amount of information displayed in the module of the plurality of modules, and wherein a decrease in the size of the module of the plurality of modules is associated with a decrease in an amount of information displayed in the module of the plurality of modules; and
automatically inputting, by the computer based system, the data to the field to be populated using information from the personal-finance toolbar on the Web page in response to activation of the icon displayed on the personal-finance toolbar identifying the particular transaction account associated with the data, wherein a system of the purchase page is configured to contact an issuer of the particular transaction account issuer for payment to complete the transaction.

14. The method according to claim 13, further comprising: authenticating the identification information prior to providing the financial information to the personal-finance toolbar display.

* * * * *